US012670445B2

(12) United States Patent
Crabtree et al.

(10) Patent No.: US 12,670,445 B2
(45) Date of Patent: *Jun. 30, 2026

(54) REMOVING BIASES WITHIN A DISTRIBUTED MODEL

(71) Applicant: QOMPLX LLC, Reston, VA (US)

(72) Inventors: Jason Crabtree, Vienna, VA (US);
Andrew Sellers, Monument, CO (US)

(73) Assignee: QOMPLX LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/633,486

(22) Filed: Apr. 11, 2024

(65) Prior Publication Data

US 2024/0256982 A1 Aug. 1, 2024

Related U.S. Application Data

(63) Continuation of application No. 17/099,897, filed on Nov. 17, 2020, now Pat. No. 11,960,978, which is a continuation of application No. 15/790,327, filed on Oct. 23, 2017, now Pat. No. 10,860,951, and a continuation-in-part of application No. 15/616,427, filed on Jun. 7, 2017, now abandoned, which is a continuation-in-part of application No. 14/925,974, filed on Oct. 28, 2015, now abandoned, said
(Continued)

(51) Int. Cl.
| | |
|---|---|
| *G06N 20/00* | (2019.01) |
| *G06F 16/215* | (2019.01) |
| *G06F 16/951* | (2019.01) |
| *G06F 18/20* | (2023.01) |
| *G06F 18/214* | (2023.01) |
| *G06F 18/24* | (2023.01) |
| *G06N 5/022* | (2023.01) |
| *H04L 67/10* | (2022.01) |

(52) U.S. Cl.
CPC ........... *G06N 20/00* (2019.01); *G06F 16/215* (2019.01); *G06F 16/951* (2019.01); *G06F 18/214* (2023.01); *G06F 18/24* (2023.01); *G06N 5/022* (2013.01); *H04L 67/10* (2013.01); *G06F 18/29* (2023.01)

(58) Field of Classification Search
CPC ...... G06N 20/00; G06N 5/022; G06F 16/215; G06F 16/951; G06F 18/24; G06F 18/214; G06F 18/29; H04L 67/10
See application file for complete search history.

(56) References Cited

U.S. PATENT DOCUMENTS

| | | | |
|---|---|---|---|
| 5,953,011 A | 9/1999 | Matsuoka |
| 6,256,544 B1 | 7/2001 | Weissinger |
| (Continued) | | |

FOREIGN PATENT DOCUMENTS

| | | |
|---|---|---|
| WO | 2014159150 A1 | 10/2014 |
| WO | 2017075543 A1 | 5/2017 |

*Primary Examiner* — Hares Jami
(74) *Attorney, Agent, or Firm* — NK Patent Law

(57) ABSTRACT

Improving a distributed model with distributed data receives an instance of the distributed model from the network-connected computing system, create a cleansed dataset from data stored in the memory with at least biases within the data stored in memory corrected, train the instance of the distributed model with the cleansed dataset, and generate an update report based at least in part by updates to the instance of the distributed model.

39 Claims, 8 Drawing Sheets

Related U.S. Application Data application No. 15/790,327 is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned.

(60) Provisional application No. 62/568,291, filed on Oct. 4, 2014.

(56) References Cited

U.S. PATENT DOCUMENTS

| | | | |
|---|---|---|---|
| 6,763,338 B2 | 7/2004 | Kirshenbaum | |
| 8,255,838 B2 | 8/2012 | Xue et al. | |
| 9,069,725 B2 | 6/2015 | Jones | |
| 9,111,212 B2 | 8/2015 | Jones | |
| 9,892,344 B1 * | 2/2018 | Tran | G06V 10/82 |
| 10,097,485 B2 | 10/2018 | Huang et al. | |
| 10,108,907 B2 | 10/2018 | Bugay et al. | |
| 10,110,415 B2 | 10/2018 | Radivojevic et al. | |
| 10,152,676 B1 * | 12/2018 | Strom | G06N 3/084 |
| 10,380,140 B2 | 8/2019 | Sherman | |
| 11,030,520 B2 | 6/2021 | Mankovskii et al. | |
| 11,138,514 B2 | 10/2021 | Hu et al. | |
| 11,308,049 B2 | 4/2022 | Suleiman et al. | |
| 2011/0225287 A1 * | 9/2011 | Dalal | G06Q 10/10 |
| | | | 709/224 |
| 2016/0275123 A1 | 9/2016 | Lin et al. | |
| 2016/0300252 A1 * | 10/2016 | Frank | G06F 21/6245 |
| 2018/0032908 A1 * | 2/2018 | Nagaraju | G06F 11/3072 |
| 2018/0276560 A1 | 9/2018 | Hu et al. | |
| 2018/0349769 A1 | 12/2018 | Mankovskii et al. | |
| 2019/0079898 A1 * | 3/2019 | Xiong | G06F 9/5072 |

* cited by examiner

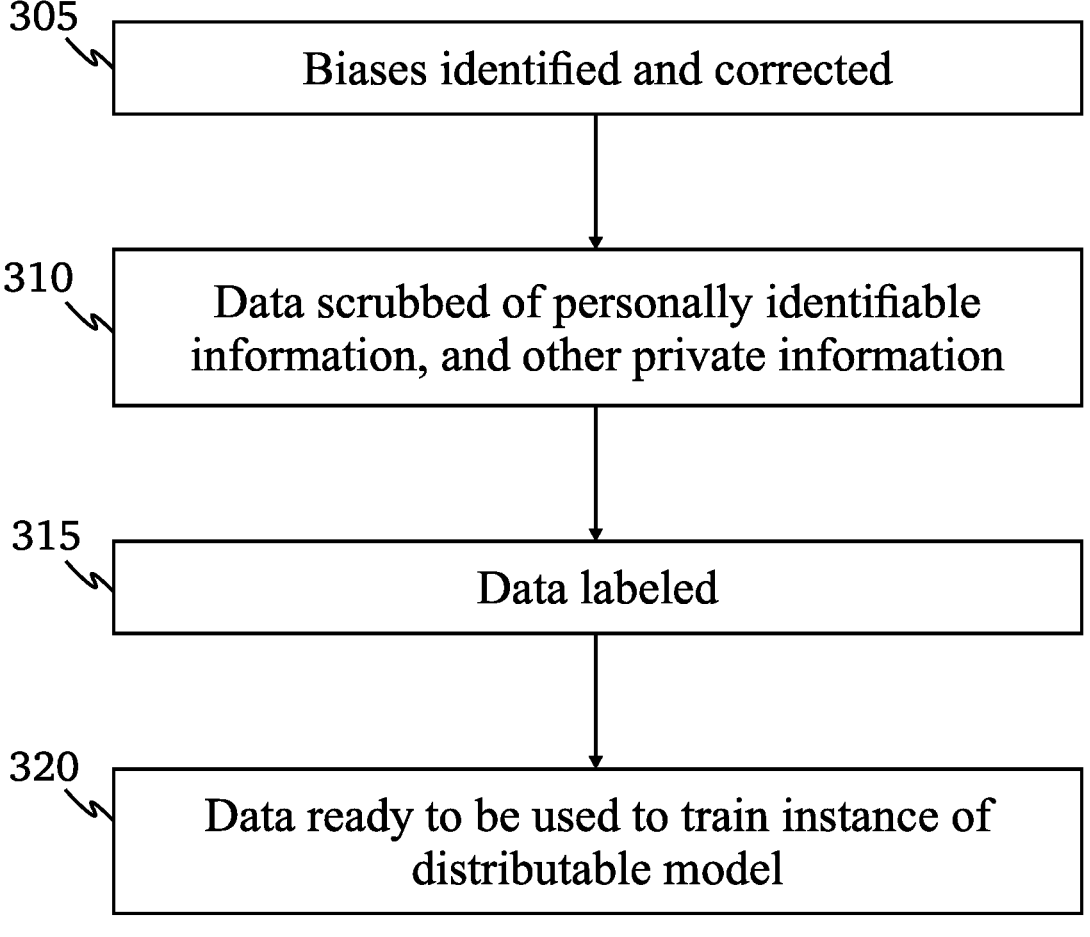
305 ⌇ Biases identified and corrected
310 ⌇ Data scrubbed of personally identifiable information, and other private information
315 ⌇ Data labeled
320 ⌇ Data ready to be used to train instance of distributable model
Fig. 3
300

405 — Instance of distributable model shared with electronic device

410 — Data on device is cleansed and sanitized prior to use for training instanced model 415 — Instanced model trained with cleansed data on device 420 — Report of changes made to instanced model transferred to distributable model source 425 — Model update report used to improve distributable model

400

REMOVING BIASES WITHIN A DISTRIBUTED MODEL

CROSS-REFERENCE TO RELATED APPLICATIONS

Priority is claimed in the application data sheet to the following patents or patent applications, each of which is expressly incorporated herein by reference in its entirety:
Ser. No. 17/099,897
Ser. No. 15/790,327
62/568,291
Ser. No. 15/141,752
Ser. No. 15/091,563
Ser. No. 14/986,536
Ser. No. 14/925,974
Ser. No. 15/616,427

BACKGROUND OF THE INVENTION

Field of the Invention

The disclosure relates to the field of machine learning, more particularly to model improvement using data distributed across multiple devices.

Discussion of the State of the Art

In traditional machine learning, data is generally gathered and processed at a central location. The gathered data may then be used to train models. However, gatherable data, through means such as web scraping, or news aggregation, may be relatively narrow in scope compared to what is stored on devices, for instance a person's mobile device or crime data from a local police station. This data may seldom leave the devices it is stored on due to the possibility of it containing sensitive data, and also the bandwidth required to transfer the data may be extensive.

Another possible problem with data stored on distributed devices is that the data may contain biases that may not be conducive for use to train a general-use model. These biases, for example, may exist on devices from certain regions, various age groups, or various ethnicities.

What is needed is a system in which data on distributed devices may be used to improve a model, while correcting data bias that may exist within the data, and also maintaining privacy for the owner of the data. Such a system would also need a method of improving the model with potentially vast amounts of data while keeping bandwidth usage as low as possible.

SUMMARY OF THE INVENTION

Accordingly, the inventor has conceived a system and method for improving a distributed model with distributed data.

In a preferred embodiment, a distributed model source provides an instanced copy of the distributed model to external devices. The external devices may then use a cleaned and corrected version of its stored data to improve its instanced model on the device, resulting in a report based on the updates made to the instanced model. The report is then transferred to the distributed model source, and may be used to improve on the distributed model.

In one aspect of the invention, a system for improving a distributed model with distributed data is provided, comprising a network-connected distributed model source comprising a memory, a processor, and a plurality of programming instructions stored in the memory thereof and operable on the processor thereof, wherein the programmable instructions, when operating on the processor, cause the processor to serve instances of a distributed model; and a directed computation graph module comprising a memory, a processor, and a plurality of programming instructions stored in the memory thereof and operable on the processor thereof, wherein the programmable instructions, when operating on the processor, cause the processor to receive at least an instance of the distributed model from the network-connected computing system, create a cleansed dataset from data stored in the memory with at least biases within the data stored in memory corrected, train the instance of the distributed model with the cleansed dataset, and generate an update report based at least in part by updates to the instance of the distributed model.

In another embodiment of the invention, at least a portion the cleansed dataset is data that has had sensitive information removed. In another embodiment of the invention at least a portion of the update report is used by the network-connected distributed model source to improve the distributed model. In another embodiment of the invention at least a portion of the data stored in memory is medical-related data. In another embodiment of the invention at least a portion of the data stored in memory is crime-related data. In another embodiment of the invention at least a portion of the data stored in memory is banking-related data.

In another embodiment of the invention, the network-connected distributed model source categorizes an incoming update report based at least in part by geographical origin of the incoming update report. In another embodiment of the invention, the update report is used to improve a distributed model specific to the geographical origin. In another embodiment of the invention, the distributed model specific to the geographical origin is not improvable with update reports from other geographical origins.

In another aspect of the invention, a method for improving a distributed model with distributed data is provided, comprising the steps of: (a) serving instances of a distributed model with a network-connected distributed model source; (b) receiving at least an instance of the distributed model from the network-connected computing system with a directed computation graph module; (c) creating a cleansed dataset from data stored in the memory with at least biases within the data stored in memory corrected with the directed computation graph module; (d) training the instance of the distributed model with the cleansed dataset with the directed computation graph module; and (e) generating an update report based at least in part by updates to the instance of the distributed model with the directed computation graph module.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 3 is a flowchart illustrating a method for cleaning and sanitizing data stored on an electronic device before training an instance of a distributed model according to various embodiments of the invention.

DETAILED DESCRIPTION OF THE INVENTION

Figure 1:
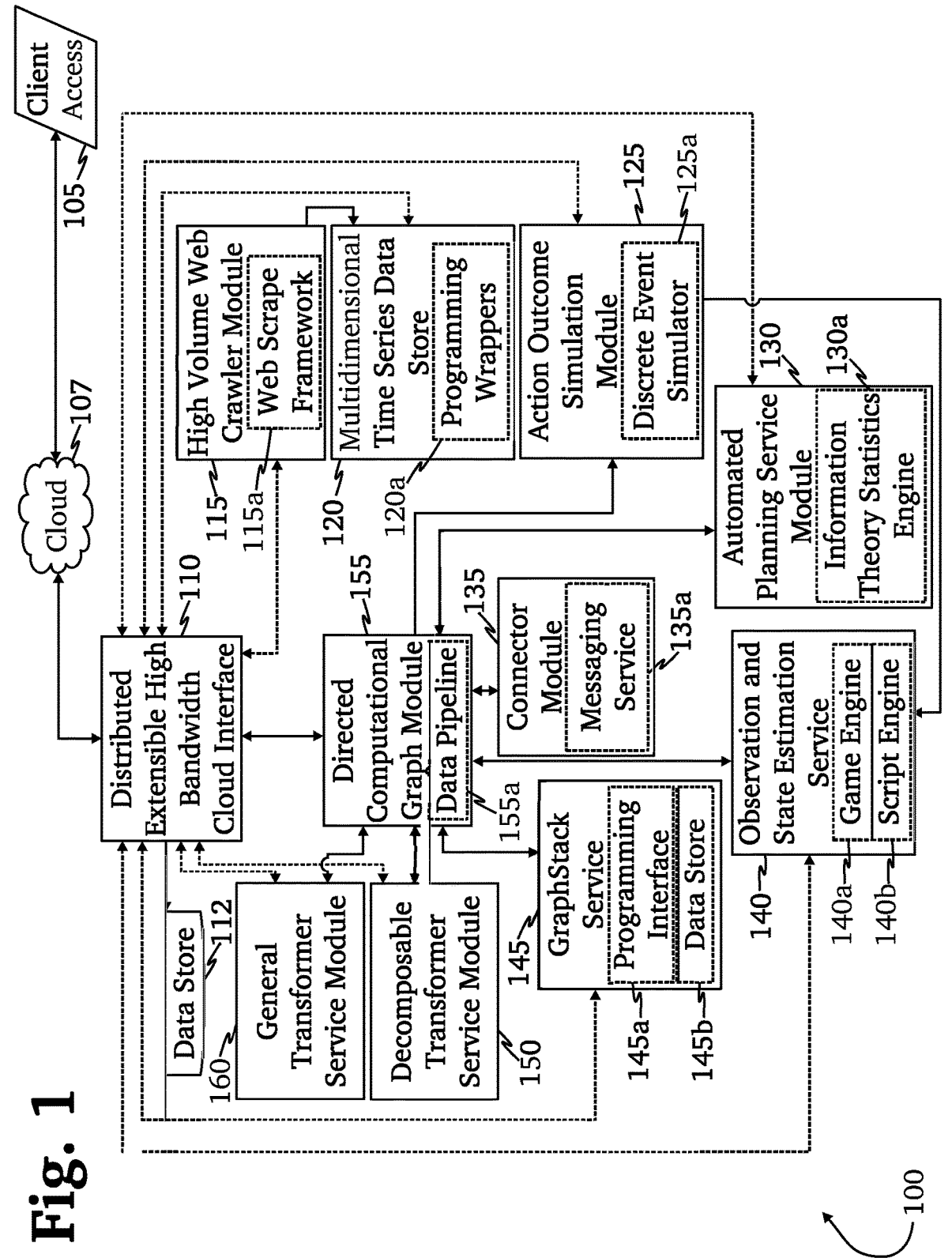
FIG. 1 is a diagram of an exemplary architecture of a business operating system according to an embodiment of the invention.

The inventor has conceived, and reduced to practice, a system and method for improving a distributed model with distributed data.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a diagram of an exemplary architecture of a business operating system 100 according to an embodiment of the invention. Client access to system 105 for specific data entry, system control and for interaction with system output such as automated predictive decision making and planning and alternate pathway simulations, occurs through the system's distributed, high bandwidth, extensible high bandwidth cloud interface 110 which uses a versatile, robust web application driven interface for both input and display of client-facing information and a data store 112 such as, but not limited to MONGODB™, COUCHDB™, CASSANDRA™ or REDIS™ depending on the embodiment. Much of the business data analyzed by the system both from sources within the confines of the client business, and from cloud based sources 107, public or proprietary such as, but not limited to: subscribed business field specific data services, external remote sensors, subscribed satellite image and data feeds and web sites of interest to business operations both general and field specific, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database 120 and a graph stack service 145. Directed computational graph module 155 retrieves one or more streams of data from a plurality of sources, which includes, but is not limited to, a plurality of physical sensors, network service providers, web based questionnaires and surveys, monitoring of electronic infrastructure, crowd sourcing campaigns, and human input device information. Within directed computational graph module 155, data may be split into two identical streams in a specialized pre-programmed data pipeline 155a, wherein one sub-stream may be sent for batch processing and storage while the other sub-stream may be reformatted for transformation pipeline analysis. The data may be then transferred to a general transformer service module 160 for linear data transformation as part of analysis or the decomposable transformer service module 150 for branching or iterative transformations that are part of analysis. Directed computational graph module 155 represents all data as directed graphs where the transformations are nodes and the result messages between transformations edges of the graph. High-volume web crawling module 115 may use multiple server hosted preprogrammed web spiders which, while autonomously configured, may be deployed within a web scraping framework 115a of which SCRAPY™ is an example, to identify and retrieve data of interest from web based sources that are not well tagged by conventional web crawling technology. Multiple dimension time series data store module 120 may receive streaming data from a large plurality of sensors that may be of several different types. Multiple dimension time series data store module 120 may also store any time series data encountered by system 100 such as, but not limited to, environmental factors at insured client infrastructure sites, component sensor readings and system logs of some or all insured client equipment, weather and catastrophic event reports for regions an insured client occupies, political communiques and/or news from regions hosting insured client infrastructure and network service information captures (such as, but not limited to, news, capital funding opportunities and financial feeds, and sales, market condition), and service related customer data. Multiple dimension time series data store module 120 may accommodate irregular and high-volume surges by dynamically allotting network bandwidth and server processing channels to process the incoming data. Inclusion of programming wrappers 120a for languages—examples of which may include, but are not limited to, C++, PERL, PYTHON, and ERLANG™—allows sophisticated programming logic to be added to default functions of multidimensional time series database 120 without intimate knowledge of the core programming, greatly extending breadth of function. Data retrieved by multidimensional time series database 120 and high-volume web crawling module 115 may be further analyzed and transformed into task-optimized results by directed computational graph 155 and associated general transformer service 160 and decomposable transformer service 150 modules. Alternately, data from the multidimensional time series database and high-volume web crawling modules may be sent, often with scripted cuing information determining important vertices 145a, to graph stack service module 145 which, employing standardized protocols for converting streams of information into graph representations of that data, for example open graph internet technology (although the invention is not reliant on any one standard). Through the steps, graph stack service module 145 represents data in graphical form influenced by any pre-determined scripted modifications 145a and stores it in a graph-based data store 145b such as GIRAPH™ or a key-value pair type data store REDIS™, or RIAK™, among others, any of which are suitable for storing graph-based information.

Results of the transformative analysis process may then be combined with further client directives, additional business rules and practices relevant to the analysis and situational information external to the data already available in automated planning service module 130, which also runs powerful information theory-based predictive statistics functions and machine learning algorithms 130a to allow future trends and outcomes to be rapidly forecast based upon the current system derived results and choosing each a plurality of possible business decisions. Then, using all or most available data, automated planning service module 130 may propose business decisions most likely to result in favorable business outcomes with a usably high level of certainty. Closely related to the automated planning service module 130 in the use of system-derived results in conjunction with possible externally supplied additional information in the assistance of end user business decision making, action outcome simulation module 125 with a discrete event simulator programming module 125a coupled with an end user-facing observation and state estimation service 140, which is highly scriptable 140b as circumstances require and has a game engine 140a to more realistically stage possible outcomes of business decisions under consideration, allows business decision makers to investigate the probable outcomes of choosing one pending course of action over another based upon analysis of the current available data.

Figure 2:
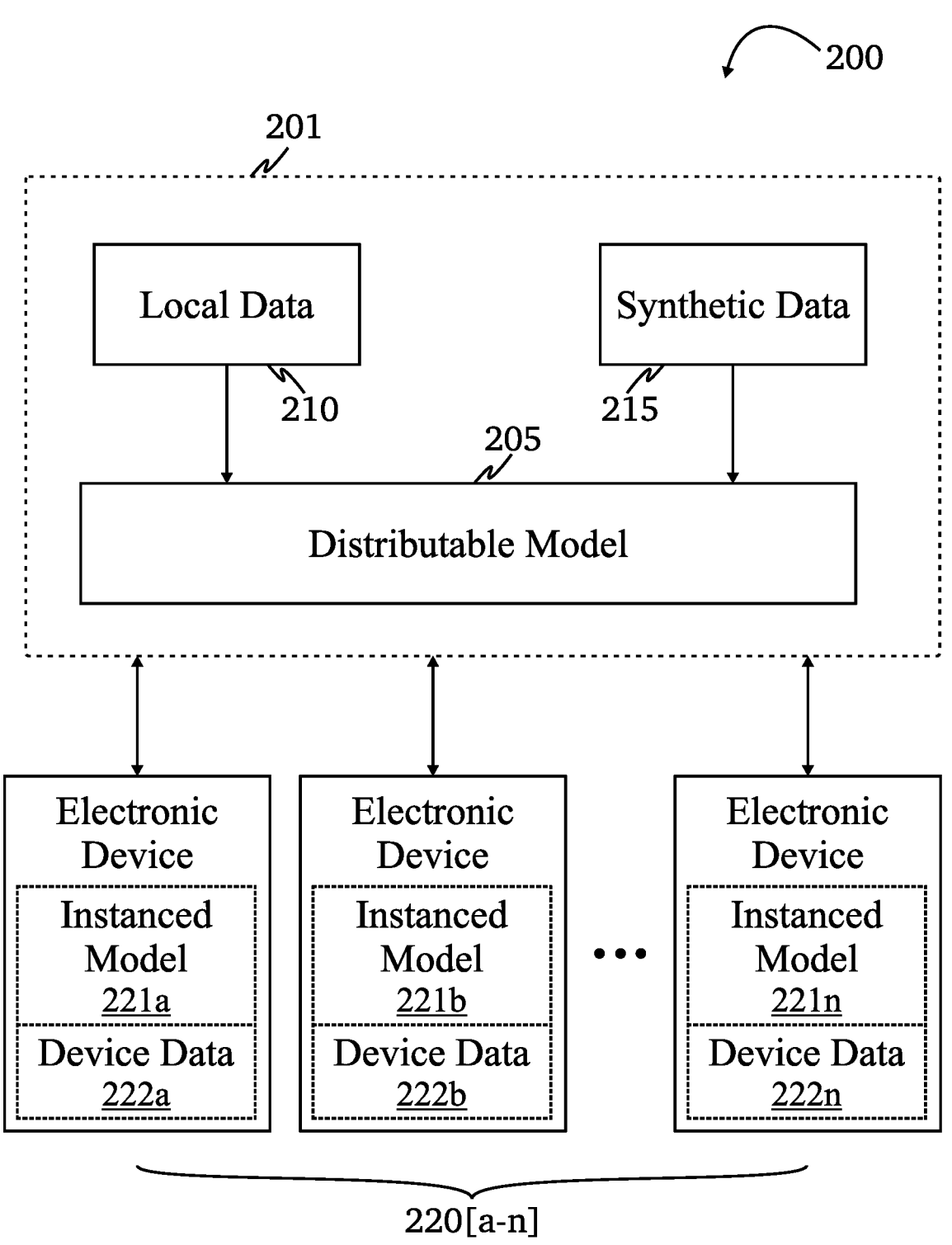
FIG. 2 is a block diagram of an exemplary system that may be used for improving a distributed model with data distributed amongst a plurality of devices with a business operating system according to various embodiments of the invention.

FIG. 2 is a block diagram of an exemplary system 200 that may be used for improving a distributed model with data distributed amongst a plurality of devices with a business operating system according to various embodiments of the invention. System 200 comprises a distributed model source 201, and a plurality of electronic devices 220[a-n]. Model source 201 may comprise a distributed model 205, a local data store 210, and a synthetic data store 215; while the electronic devices each may have an instanced model 221 [a-n], and device data 222[a-n]. Electronic devices 220[a-n] may be any type of computerized hardware commonly used in the art, including, but not limited to, desktop computers, laptops, mobile devices, tablets, and computer clusters. For simplicity, the discussions below regarding system 200 will be from the perspective of a singular device 220a, which comprises instanced model 221a and device data 222a. It should be understood that devices 220[a-n] may operate independently, and in a manner similar to device 220a.

Model source 201 may be configured to serve an instanced copy of distributed model 205 to device 220a, and may be any type of computerized hardware used in the art configured to use business operating system 100, and may communicate with connected devices via directed computation graph data pipeline 155a which may allow incoming and outgoing data to be processed on-the-fly. Distributed model 205 may be a model conventionally used in the art in machine learning, or it may be a specialized model that has been tuned to more efficiently utilize training data that has been distributed amongst various devices while still being able to be trained through traditional machine learning methods. Local data 210 may comprise data that was been previously stored, or data is that in the process of being stored, for example, data that is presently being gathered through monitoring of other systems. Synthetic data 215 may be data that has been intelligently and/or predictively generated to fit the context of a model, and is generally based on real-world trends and events. Examples of synthetic data 215 may include data that has been gathered from running computer simulations; data that has been generated using the predictive simulation functions of business operating system 100 with previously stored data, and current trends; or with the use of other specialized software, such as SNORKEL. Local data 210 and synthetic data 215 may be used by model source 201 as training data for distributed model 205. Although illustrated in FIG. 2 as stored within model source 201, it will be appreciated by one skilled in the art that local data 210 and synthetic data 215 may originate from external systems, and provided to model source 201 through some means such as, for example, the internet or a local area network connection.

In system 200, device 220a may connect to model source 201 via a network connection, such as through the internet, local area network, virtual private network, or the like, where device 220a may be provided an instanced copy of the distributed model 221a. Device 220a may then cleanse and sanitize its own data 222a, and train its instanced model 221a with the cleansed data. A report based on the updates made to instanced model 221a is generated on device 220a, and then transmitted back to model source 201. The report may be used by model source 201 to improve distributed model 205. In a preferred embodiment, devices 220[a-n] may comprise systems configured to use business operating system 100, and utilize its directed computation graph capabilities, amongst other functions, to process the data. However, in some embodiments, hardware for the electronic devices may be, for example, a mobile device or computer system running another operating system. These systems may use specialized software configured to process the data according to established compatibility specifications.

System 200 may also be configured to allow certain biases in the data to remain. Biases such as geographical origin of data may be necessary in some cases to adhere to local laws. For example, some countries may have certain laws in place to prevent import and export of data to and from some other restricted countries. By taking into consideration the bias regarding geographical origin of the data, the bias may be used to classify the incoming update reports. The update reports may then be used to train a geographically-restricted distributed model without including data from other restricted countries, while still including data from non-restricted countries.

To provide another example application, crime reports and data distributed across multiple police municipalities may contain information regarding new trends in crime that may be relevant to crime prediction models. However, this data may contain sensitive non-public information that must stay within that particular municipality. With the system described herein, the data may be scrubbed of sensitive information, used to train an instance of the crime prediction model, and the relevant data may be indirectly integrated into the crime prediction model. Since the actual data does not leave the computer system of that particular municipality, this can be done without any concern of sensitive information leaking out.

It should be understood that electronic devices 220[a-n] do not have to all concurrently be connected to model source 201 at the same time, and any number of devices may be actively connected to, and interacting with model source 201 at a given time. Also, improving of a distributed model, improving of an instanced model, and the back and forth communication may not be running continuously, and may be executed only when required. Furthermore, for simplicity, FIG. 2 illustrates only one instance. However, in practice, system 200 may be a segment of a potentially larger system with multiple distributed model sources; or a distributed model source may store and serve a plurality of distributed models. Electronic devices 220[a-n] are not limited to interacting with just one distributed model source, and may connect with, and interact with, as many distributed model sources as is required.

Detailed Description of Exemplary Aspects

FIG. 3 is a flowchart illustrating a method 300 for cleaning and sanitizing data stored on an electronic device before training an instance of a distributed model according to various embodiments of the invention. At an initial step 305, biases found within the data May be identified, and corrected so that the data may be more conducive for usage in a generalized distributed model. Biases may include, but is not limited to, local or regional trends, language or racial trends, and gender trends. The biases may be intelligently weighted to provide useful insight without overfitting the data sets. In some embodiments, the bias data may be specially identified and stored to be used on other, more regionalized distributed models. At step 310, in order to maintain privacy of users and systems, the data may be scrubbed of personally identifiable information, and other sensitive information. This information may include banking information, medical history, addresses, personal history, and the like. At step 315, the data, now cleansed and sanitized, may be labeled to be used as training data. At step 320, the data is now appropriately formatted to be used for training an instanced model.

It should be noted that method 300 outlines one method for cleaning and sanitizing data. In other embodiments, some of the steps in method 300 may be skipped, or other steps may be added. Besides being used for training an instanced model, and ultimately improving a distributed model, the data may be processed in a similar fashion to become more generalized and appropriate for transfer for usage in training models belonging to different domains. This allows data that has been previously gathered to be re-used in new models, without the sometimes arduous of regathering data that is specially formatted for the context of a specific domain of the newly created model.

Figure 4:
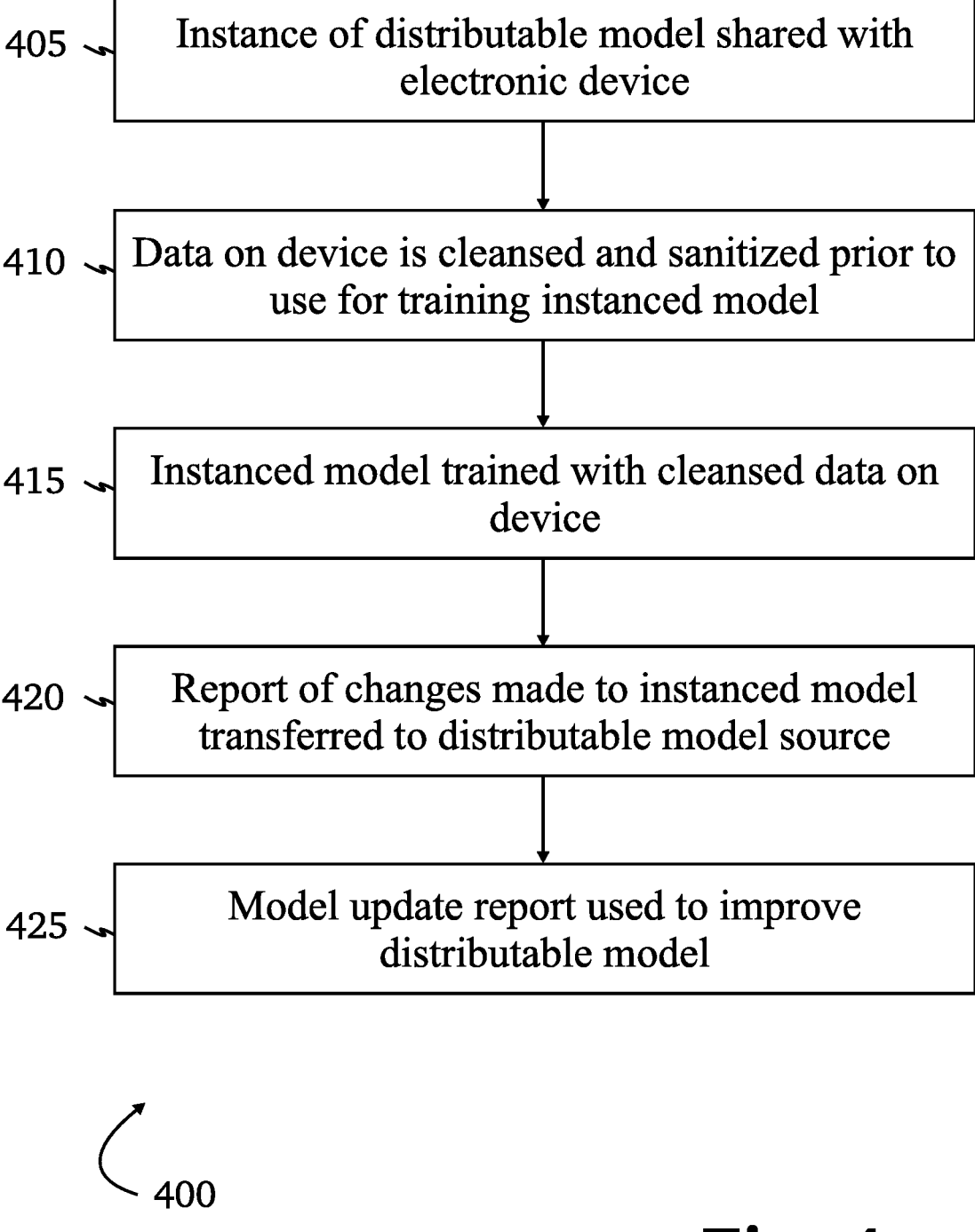
FIG. 4 is a flowchart illustrating a method for improving a distributed model on a device external from the source of the model according to various embodiments of the invention.

FIG. 4 is a flowchart illustrating a method 400 for improving a distributed model on a device external from the source of the model according to various embodiments of the invention. At an initial step 405, an instance of the distributed model is shared with a device from the distributed model source. At step 410, the data on the device is cleansed and sanitized, one such method is outlined in FIG. 3. At step 415, the data, now in a format suitable for use in training a general-use distributed model, may be used to train the instanced model on the device. At step 420, a report based on updates to the instanced model may be generated, and transferred to the distributed model source. One benefit of generating and transferring a report, as opposed to transferring of the data itself, is that it may be a more efficient approach than transferring all data required to improve a distributed model. Also, since the raw data does not need to leave the device, this method may help further ensure sensitive information is not leaked. At step 425, the report is used by the distributed model source to improve the distributed model.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 5:
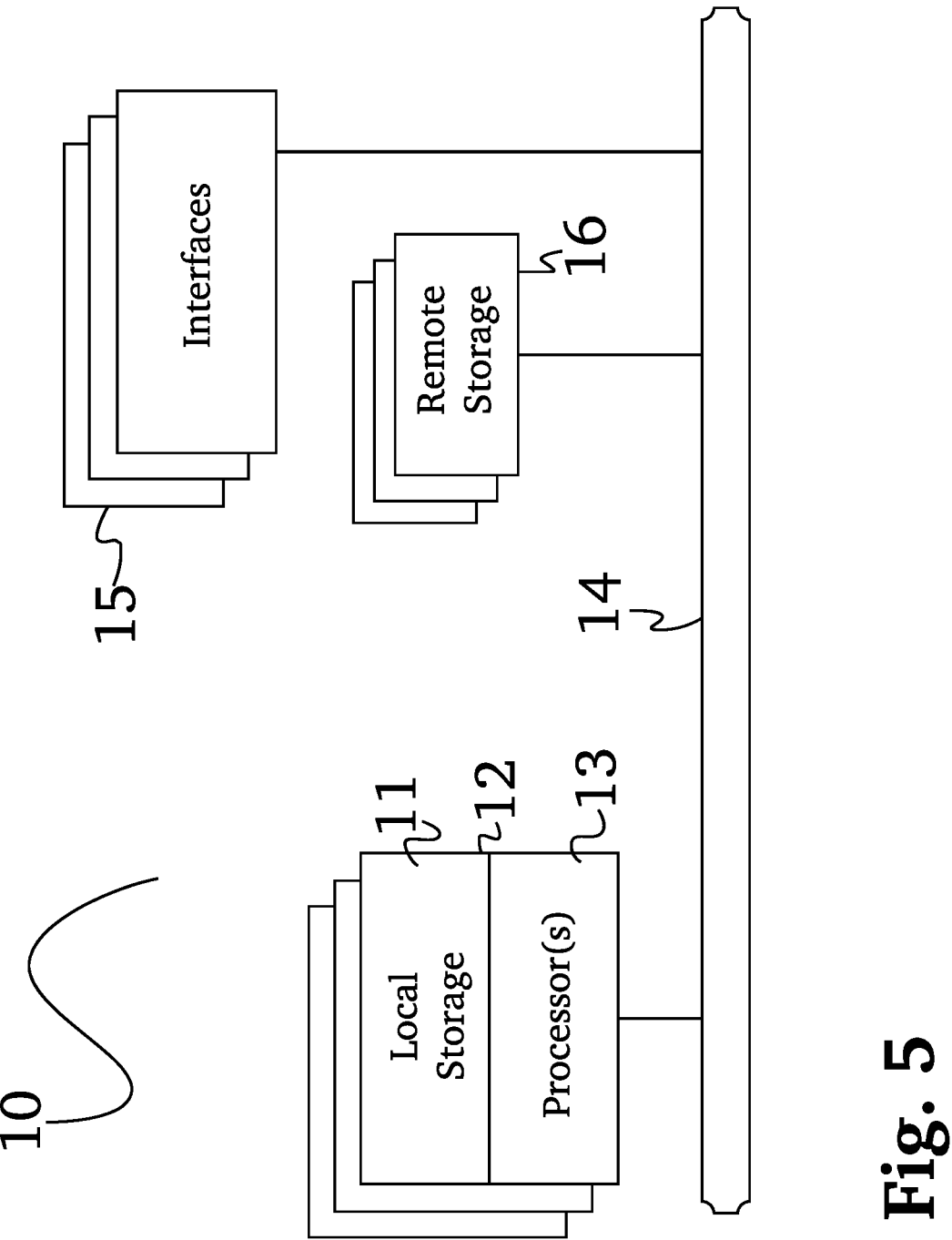
FIG. 5 is a block diagram illustrating an exemplary hardware architecture of a computing device used in various embodiments of the invention.

Referring now to FIG. 5, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAP-DRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 5 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 6:
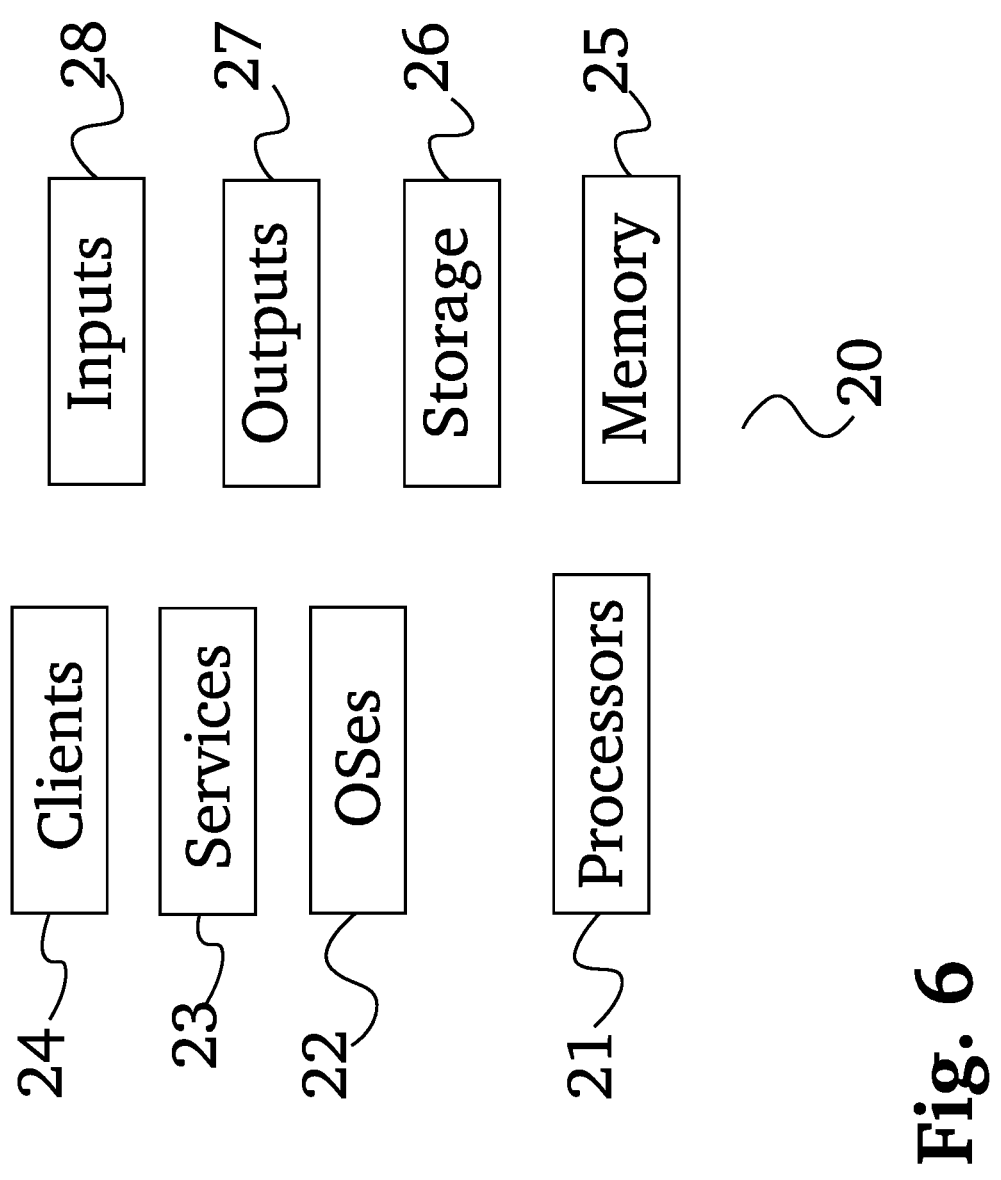
FIG. 6 is a block diagram illustrating an exemplary logical architecture for a client device, according to various embodiments of the invention.

In some aspects, systems may be implemented on a standalone computing system. Referring now to FIG. 6, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

Figure 7:
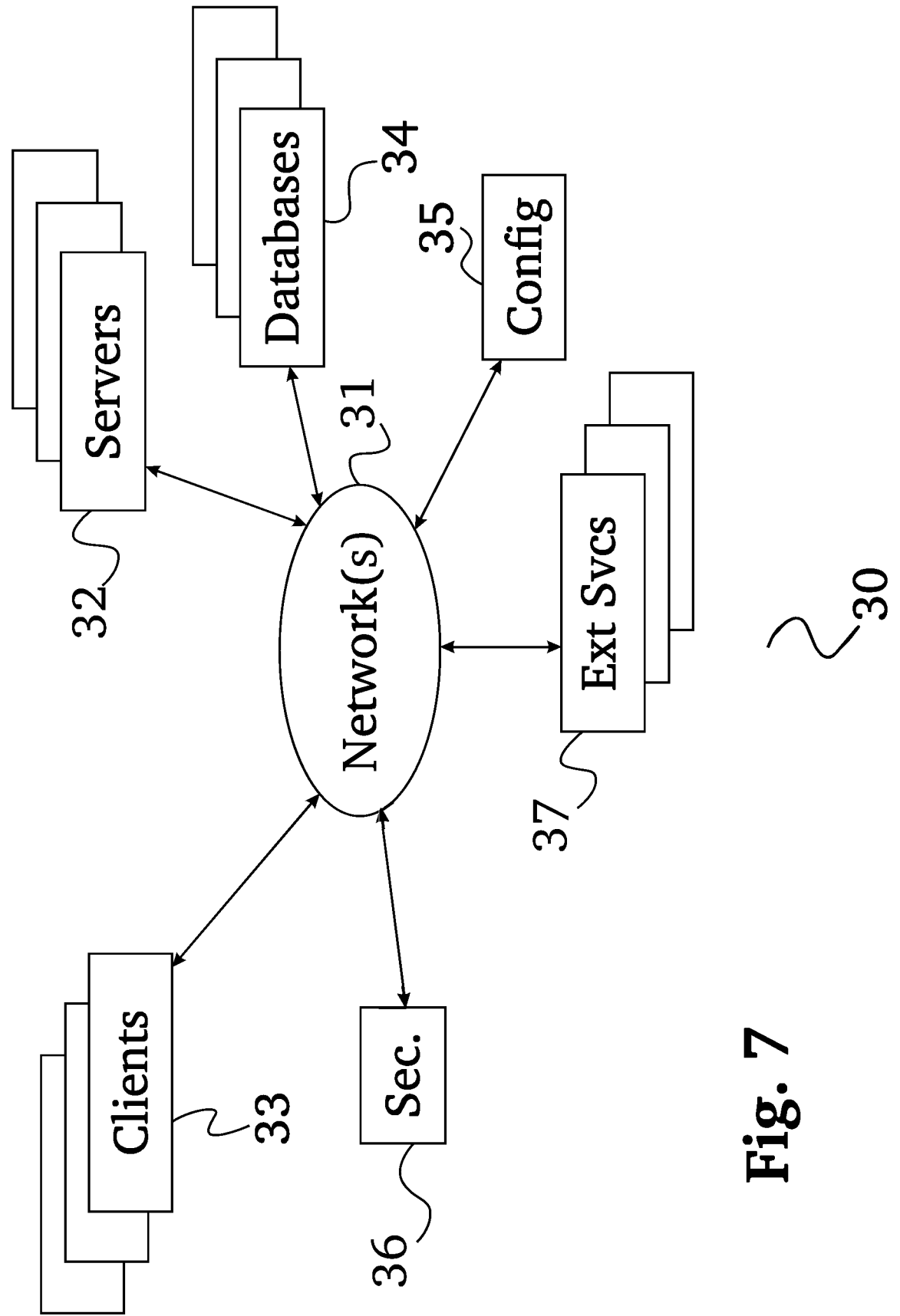
FIG. 7 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 7, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 6. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as Wi-Fi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 8:
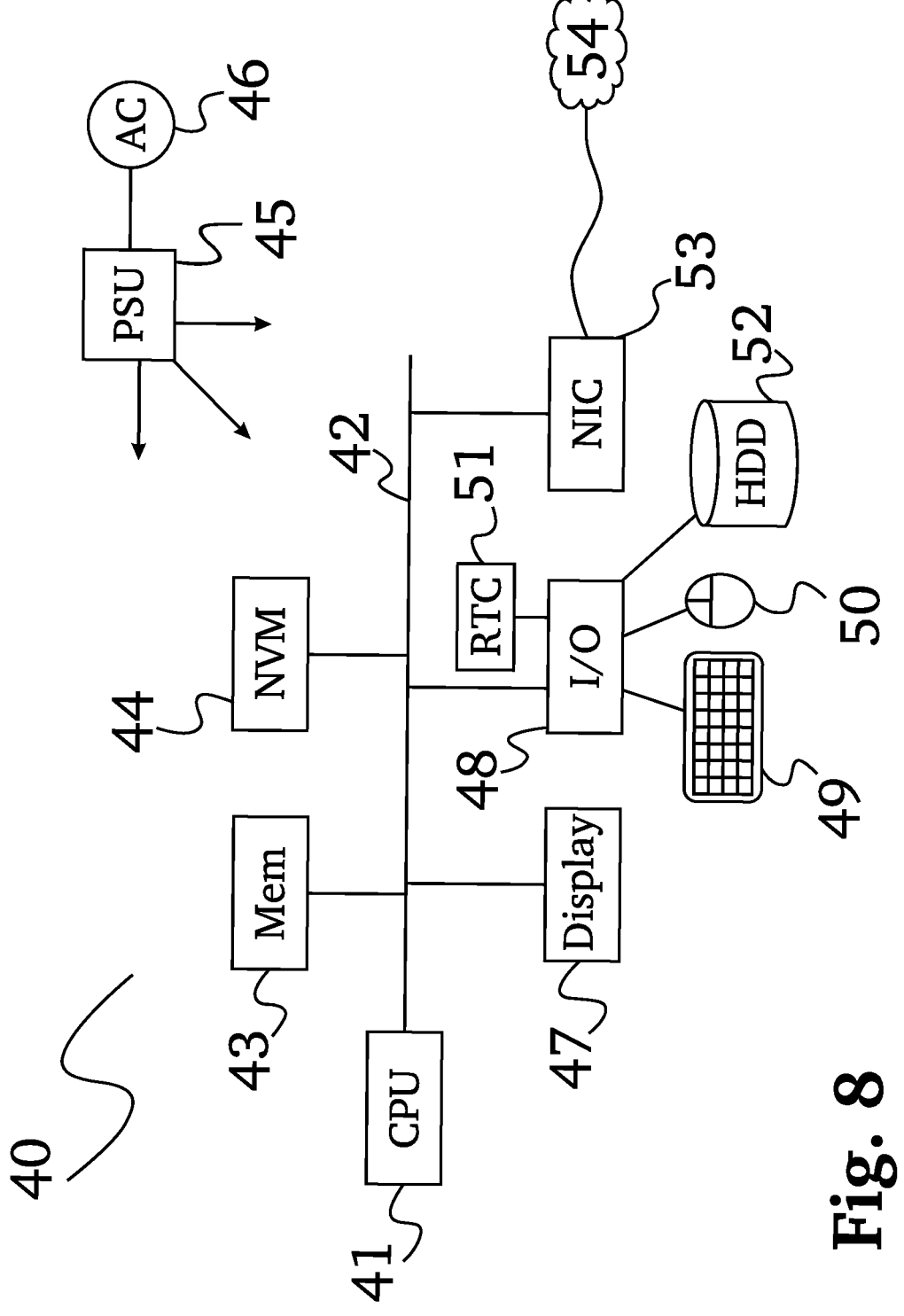
FIG. 8 is another block diagram illustrating an exemplary hardware architecture of a computing device used in various embodiments of the invention.

FIG. 8 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein.

It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for improving a distributed model with distributed data, comprising one or more computers with executable instructions that, when executed, cause the system to:

receive an instance of a distributed model via a computer network;

locally process data on a computing device to maintain data privacy, wherein the local processing comprises:

locally identifying a plurality of data biases within the instance of the distributed model, wherein the plurality of data biases are identified by computing differences between data stored locally on the computing device and data of the distributed model;

creating a modified dataset based on the distributed model and one or more identified biases of the identified plurality of data biases, wherein creating the modified dataset comprises at least one of:

removing one or more of the identified biases from the data stored locally on the computing device; or generating synthetic data that approximates characteristics of the data stored locally on the computing device while reducing one or more of the identified biases;

wherein one or more of the identified biases are automatically weighted and corrected by a local machine learning algorithm to generalize the modified dataset for use in the distributed model while adhering to local laws and data handling requirements;

locally training the instance of the distributed model using the modified dataset; and generating an update report based upon which remote instances of the distributed model may be adjusted to use the modified dataset, wherein the update report is structured to enable integration with the distributed model while maintaining local data requirements and reducing network resource utilization compared to centralized model training approaches; and transfer the update report to the distributed model to improve the distributed model via the computer network.

2. The system of claim 1, wherein at least a portion of the modified dataset is data that has had sensitive information removed.

3. The system of claim 1, wherein the system is further caused to improve the distributed model using at least a portion of the update report.

4. The system of claim 1, wherein at least a portion of the data processed locally on the computing device is medical-related data.

5. The system of claim 1, wherein at least a portion of the data processed locally on the computing device is crime-related data.

6. The system of claim 1, wherein at least a portion of the data processed locally on the computing device is banking-related data.

7. The system of claim 3, wherein improving the distributed model comprises classifying an incoming update report based at least in part by geographical origin of the incoming update report.

8. The system of claim 7, wherein the update report is used to improve a distributed model specific to the geographical origin.

9. The system of claim 8, wherein the distributed model specific to the geographical origin is updated using only update reports from the geographical origin.

10. The system of claim 1, wherein the modified dataset is created by removing biased data.

11. A method for improving a distributed model with distributed data, comprising the steps of:
 receiving an instance of a distributed model via a computer network;
 locally processing data on a computing device to maintain data privacy, wherein the local processing comprises:
 locally identifying a plurality of data biases within the instance of the distributed model, wherein the plurality of data biases are identified by computing differences between data stored locally on the computing device and data of the distributed model;
 creating a modified dataset based on the distributed model and one or more identified biases of the identified plurality of data biases, wherein creating the modified dataset comprises at least one of:
 removing one or more of the identified biases from the data stored locally on the computing device; or
 generating synthetic data that approximates characteristics of the data stored locally on the computing device while reducing one or more of the identified biases;
 wherein one or more of the identified biases are automatically weighted and corrected by a local machine learning algorithm to generalize the modified dataset for use in the distributed model while adhering to local laws and data handling requirements;
 locally training the instance of the distributed model using the modified dataset; and
 generating an update report based upon which remote instances of the distributed model may be adjusted to use the modified dataset, wherein the update report is structured to enable integration with the distributed model while maintaining local data requirements and reducing network resource utilization compared to centralized model training approaches; and
 transferring the update report to the distributed model to improve the distributed model via the computer network.

12. The method of claim 11, wherein at least a portion of the modified dataset is data that has had sensitive information removed.

13. The method of claim 11, further comprising the step of using a distributed model source to improve the distributed model using at least a portion of the update report.

14. The method of claim 11, wherein at least a portion of the data processed locally on the computing device is medical-related data.

15. The method of claim 11, wherein at least a portion of the data processed locally on the computing device is crime-related data.

16. The method of claim 11, wherein at least a portion of the data processed locally on the computing device is banking-related data.

17. The method of claim 13, wherein the distributed model source categorizes an incoming update report based at least in part by geographical origin of the incoming update report.

18. The method of claim 17, wherein the update report is used to improve a distributed model specific to the geographical origin.

19. The method of claim 18, wherein the distributed model specific to the geographical origin is modified using only update reports from the geographical origins.

20. The method of claim 11, wherein the modified dataset is created by removing biased data.

21. A computing system for improving a distributed model with distributed data, the computing system comprising:
 one or more hardware processors configured for:
 receiving an instance of a distributed model via a computer network;
 locally processing data on a computing device to maintain data privacy, wherein the local processing comprises:
 locally identifying a plurality of data biases within the instance of the distributed model, wherein the plurality of data biases are identified by computing differences between data stored locally on the computing device and data of the distributed model;
 creating a modified dataset based on the distributed model and one or more identified biases of the identified plurality of biases, wherein creating the modified dataset comprises at least one of:
 removing one or more of the identified biases from the data stored locally on the computing device; or
 generating synthetic data that approximates characteristics of the data stored locally on the computing device while reducing one or more of the identified biases;
 wherein one or more of the identified biases are automatically weighted and corrected by a local machine learning algorithm to generalize the modified dataset for use in the distributed model while adhering to local laws and data handling requirements;
 locally training the instance of the distributed model using the modified dataset; and
 generating an update report based upon which remote instances of the distributed model may be adjusted to use the modified dataset, wherein the update report is structured to enable integration with the distributed model while maintaining local data requirements and reducing network resource utilization compared to centralized model training approaches; and
 transferring the update report to the distributed model to improve the distributed model via the computer network.

22. The computing system of claim 21, wherein at least a portion of the modified dataset is data that has had sensitive information removed.

23. The computing system of claim 21, wherein the one or more hardware processors are further configured for using a distributed model source to improve the distributed model using at least a portion of the update report.

24. The computing system of claim 21, wherein at least a portion of the data processed locally on the computing device is medical-related data.

25. The computing system of claim 21, wherein at least a portion of the data processed locally on the computing device is crime-related data.

26. The computing system of claim 21, wherein at least a portion of the data processed locally on the computing device is banking-related data.

27. The computing system of claim 23, wherein the distributed model source categorizes an incoming update report based at least in part by geographical origin of the incoming update report.

28. The computing system of claim 27, wherein the update report is used to improve a distributed model specific to the geographical origin.

29. The computing system of claim 28, wherein the distributed model specific to the geographical origin is modified using only update reports from the geographical origins.

30. The computing system of claim 21, wherein the modified dataset is created by removing biased data.

31. Non-transitory, computer-readable storage media having computer-executable instructions embodied thereon that, when executed by one or more processors of a computing system for improving a distributed model with distributed data, cause the computing system to:

receive an instance of a distributed model via a computer network;

locally process data on a computing device to maintain data privacy, wherein the local processing comprises:

locally identifying a plurality of data biases within the instance of the distributed model, wherein the plurality of data biases are identified by computing differences between data stored locally on the computing device and data of the distributed model;

creating a modified dataset based on the distributed model and one or more identified biases of the identified plurality of data biases, wherein creating the modified dataset comprises at least one of:

removing one or more of the identified biases from the data stored locally on the computing device; or generating synthetic data that approximates characteristics of the data stored locally on the computing device while reducing one or more of the identified biases;

wherein one or more of the identified biases are automatically weighted and corrected by a local machine learning algorithm to generalize the modified dataset for use in the distributed model while adhering to local laws and data handling requirements;

locally training the instance of the distributed model using the modified dataset; and generating an update report based upon which remote instances of the distributed model may be adjusted to use the modified dataset, wherein the update report is structured to enable integration with the distributed model while maintaining local data requirements and reducing network resource utilization compared to centralized model training approaches; and transfer the update report to the distributed model to improve the distributed model via the computer network.

32. The non-transitory, computer-readable storage media of claim 31, wherein at least a portion of the modified dataset is data that has had sensitive information removed.

33. The non-transitory, computer-readable storage media of claim 31, further wherein the system is further caused to improve the distributed model using at least a portion of the update report.

34. The non-transitory, computer-readable storage media of claim 31, wherein at least a portion of the data processed locally on the computing device is medical-related data.

35. The non-transitory, computer-readable storage media of claim 31, wherein at least a portion of the data processed locally on the computing device is crime-related data.

36. The non-transitory, computer-readable storage media of claim 31, wherein at least a portion of the data processed locally on the computing device is banking-related data.

37. The non-transitory, computer-readable storage media of claim 36, wherein the distributed model source classifies an incoming update report based at least in part by geographical origin of the incoming update report.

38. The non-transitory, computer-readable storage media of claim 37, wherein the update report is used to improve a distributed model specific to the geographical origin.

39. The non-transitory, computer-readable storage media of claim 31, wherein the modified dataset is created by removing biased data.

* * * * *